US010833878B2

(12) United States Patent
Poulard

(10) Patent No.: US 10,833,878 B2
(45) Date of Patent: Nov. 10, 2020

(54) INTEGRATED CIRCUIT WITH PARTS ACTIVATED BASED ON INTRINSIC FEATURES

(71) Applicant: RENESAS ELECTRONICS EUROPE GMBH, Duesseldorf (DE)

(72) Inventor: Fabrice Poulard, Vélizy (FR)

(73) Assignee: RENESAS ELECTRONICS EUROPE GMBH, Duesseldorf (DE)

( * ) Notice: Subject to any disclaimer, the term of this patent is extended or adjusted under 35 U.S.C. 154(b) by 443 days.

(21) Appl. No.: 15/120,207

(22) PCT Filed: Feb. 19, 2015

(86) PCT No.: PCT/EP2015/053505
§ 371 (c)(1),
(2) Date: Aug. 19, 2016

(87) PCT Pub. No.: WO2015/124673
PCT Pub. Date: Aug. 27, 2015

(65) Prior Publication Data
US 2017/0078105 A1 Mar. 16, 2017

(30) Foreign Application Priority Data
Feb. 19, 2014 (EP) .................................. 14290043

(51) Int. Cl.
*H04L 9/32* (2006.01)
*G06F 21/73* (2013.01)
(Continued)

(52) U.S. Cl.
CPC ............ *H04L 9/3278* (2013.01); *G06F 21/10* (2013.01); *G06F 21/72* (2013.01); *G06F 21/73* (2013.01)

(58) Field of Classification Search
CPC .......... G06F 21/10; G06F 21/72; G06F 21/73; H04L 9/3278
See application file for complete search history.

(56) References Cited

U.S. PATENT DOCUMENTS 5,530,749 A * 6/1996 Easter .............. G01R 31/31719
380/277
6,161,213 A * 12/2000 Lofstrom .............. H01L 23/544
257/E23.179
(Continued)

FOREIGN PATENT DOCUMENTS

GB 2268605 A 1/1994
JP 2004140376 A 5/2004
(Continued)

OTHER PUBLICATIONS

Search Query Report from IP.com (performed Jun. 16, 2020).*
(Continued)

*Primary Examiner* — Sharon S Lynch
(74) *Attorney, Agent, or Firm* — Burr & Forman, LLP

(57) ABSTRACT

A fixed logic integrated circuit is disclosed. The integrated circuit comprises a unique code generator configured to generate a code having a value which is intrinsically unique to the integrated circuit, an enrolment pattern generator configured to generate an enrolment pattern based on the unique code. The integrated circuit is configured to transmit the enrolment pattern to an external enrolment device and to receive enabling data from the external enrolment device. Optionally, the integrated circuit may include memory for storing remotely-generated enabling data. The integrated circuit comprises a configuration file generator configured to generate configuration data using the remotely-generated enabling data and the unique code, and a feature activation module configured to activate and/or disable features of the (Continued)

integrated circuit and/or customise the integrated circuit in dependence upon the configuration data.

13 Claims, 15 Drawing Sheets

(51) Int. Cl.
*G06F 21/10* (2013.01)
*G06F 21/72* (2013.01)

(56) References Cited

U.S. PATENT DOCUMENTS

| | | | | |
|---|---|---|---|---|
| 6,931,543 B1* | 8/2005 | Pang | ................ | H04N 21/23476 713/193 |
| 7,200,235 B1* | 4/2007 | Trimberger | ......... | G06F 12/1425 326/38 |
| 7,469,338 B2* | 12/2008 | Buer | ................ | G06F 21/57 380/28 |
| 7,759,968 B1* | 7/2010 | Hussein | ........... | H03K 19/17764 326/38 |
| 8,166,366 B1* | 4/2012 | Trimberger | ............. | G06F 11/10 714/725 |
| 8,418,006 B1* | 4/2013 | Trimberger | ............. | G06F 21/10 714/725 |
| 8,427,193 B1* | 4/2013 | Trimberger | .......... | H03K 19/003 326/38 |
| 8,581,618 B1* | 11/2013 | Fritz | ................ | H03K 19/17768 326/37 |
| 8,750,502 B2* | 6/2014 | Kirkpatrick | ........... | H04L 9/0866 380/44 |
| 8,867,739 B2* | 10/2014 | Danger | ............ | G01R 31/31719 380/44 |
| 8,885,819 B2* | 11/2014 | Gotze | ................ | G06F 21/44 326/8 |
| 8,990,276 B2* | 3/2015 | Lazich | ................ | G06F 7/588 326/8 |
| 9,026,882 B2* | 5/2015 | Oshida | ................ | H04L 9/3278 714/755 |
| 9,030,226 B2* | 5/2015 | Plusquellic | ........... | H04L 9/0861 326/8 |
| 9,041,411 B2* | 5/2015 | Marinissen | ...... | G01R 31/31719 324/537 |
| 9,247,024 B2* | 1/2016 | Talstra | ................ | G06F 21/10 |
| 9,300,470 B2* | 3/2016 | Oshida | ................ | H04L 9/3278 |
| 9,590,636 B1* | 3/2017 | McKinley | ........ | H03K 19/17768 |
| 2001/0032318 A1* | 10/2001 | Yip | ................ | G06F 21/76 713/190 |
| 2002/0129261 A1* | 9/2002 | Cromer | ................ | G06Q 20/341 713/193 |
| 2006/0209584 A1* | 9/2006 | Devadas | ................ | G06F 21/31 365/52 |
| 2006/0289658 A1* | 12/2006 | Fischer | ................ | G06F 21/73 235/492 |
| 2008/0270805 A1* | 10/2008 | Kean | ................ | G06F 21/76 713/189 |
| 2008/0279373 A1* | 11/2008 | Erhart | ................ | H04L 9/302 380/46 |
| 2009/0183248 A1* | 7/2009 | Tuyls | ................ | H04L 9/3278 726/9 |
| 2010/0031065 A1* | 2/2010 | Futa | ................ | H03K 3/0315 713/194 |
| 2010/0085075 A1* | 4/2010 | Luzzi | ................ | H04L 9/0866 326/8 |
| 2010/0122093 A1* | 5/2010 | Tuyls | ................ | H04L 9/3218 713/180 |
| 2010/0127822 A1* | 5/2010 | Devadas | ................ | H04L 9/3278 340/5.8 |
| 2010/0146261 A1* | 6/2010 | Talstra | ................ | G06F 21/10 713/155 |
| 2010/0183154 A1* | 7/2010 | Graunke | ................ | H04L 9/0891 380/278 |
| 2011/0047419 A1* | 2/2011 | Garnier | ................ | G06F 21/32 714/701 |
| 2011/0055851 A1* | 3/2011 | Potkonjak | ................ | G06F 21/74 719/318 |
| 2011/0113392 A1* | 5/2011 | Chakraborty | ......... | G06F 17/505 716/102 |
| 2011/0141791 A1* | 6/2011 | Ahmed | ................ | G11C 17/18 365/94 |
| 2011/0215829 A1* | 9/2011 | Guajardo Merchan | ...... | G06F 7/588 326/8 |
| 2012/0033810 A1* | 2/2012 | Devadas | ................ | G06F 21/31 380/46 |
| 2012/0319724 A1* | 12/2012 | Plusquellic | ........... | H04L 9/0861 326/8 |
| 2012/0324241 A1* | 12/2012 | Oshida | ................ | G06F 21/73 713/189 |
| 2012/0324310 A1* | 12/2012 | Oshida | ................ | H04L 9/3278 714/755 |
| 2014/0089659 A1* | 3/2014 | Brickell | ................ | G06F 21/73 713/155 |
| 2014/0140505 A1* | 5/2014 | Plusquellic | ........... | H04L 9/0861 380/44 |
| 2014/0185795 A1* | 7/2014 | Gotze | ................ | G06F 21/44 380/44 |
| 2015/0082420 A1* | 3/2015 | Love | ................ | G06F 21/6218 726/16 |
| 2015/0207629 A1* | 7/2015 | Oshida | ................ | H04L 9/3278 380/28 |
| 2016/0359636 A1* | 12/2016 | Kreft | ................ | G06F 21/71 |
| 2019/0097818 A1* | 3/2019 | Lu | ................ | H04L 9/3278 |

FOREIGN PATENT DOCUMENTS

| | | |
|---|---|---|
| JP | 2013003431 A | 1/2013 |
| WO | 2008125999 A2 | 10/2008 |
| WO | 2009024913 A2 | 2/2009 |

OTHER PUBLICATIONS

Guajardo, et al., "Physical Unclonable Functions and Public-Key Crypto for FPGA IP Protection," Aug. 1, 2007, all unclosed pages cited.

Guajardo, et al., "FPGA Intrinsic PUFs and Their Use for IP Protection," Sep. 10, 2007, all enclosed pages cited.

European Search Report and Written Opinion of corresponding EP application No. 14290043.0 dated Jul. 22, 2014, all enclosed pages cited.

International Search Report and Written Opinion of PCT/EP2015/053505 dated Jun. 18, 2015, all enclosed pages cited.

Notice of Reason for Refusal, dated Jul. 16, 2019 from the Japanese Patent Application No. 2016-552915, all enclosed pages cited.

* cited by examiner

| Activation pattern | Peripheral A state | Peripheral B state | Clock freq. mulitplier |
|---|---|---|---|
| 0x60A | Active | Inactive | 4 |
| 0x870 | Inactive | Active | 1 |
| 0xB7A | Active | Active | 8 |

Fig. 12     40

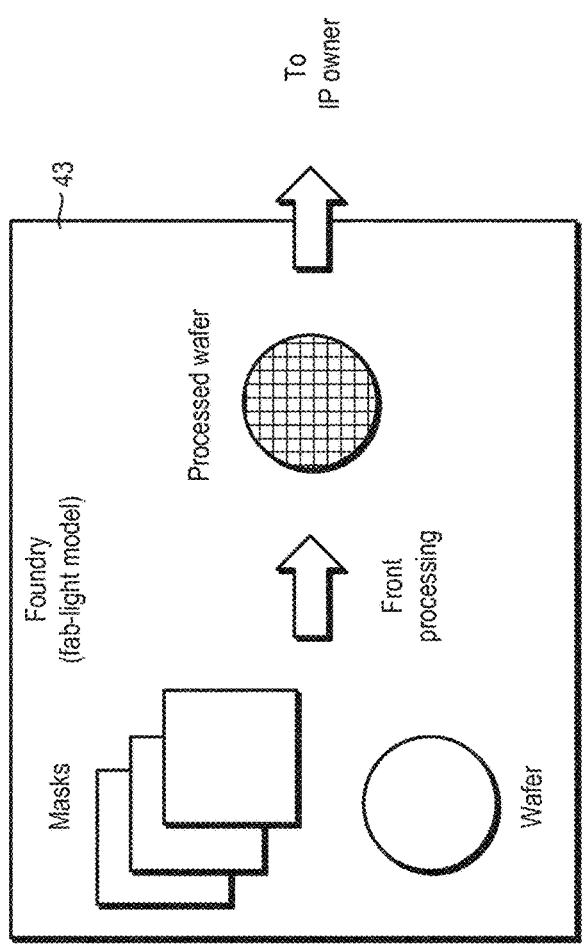
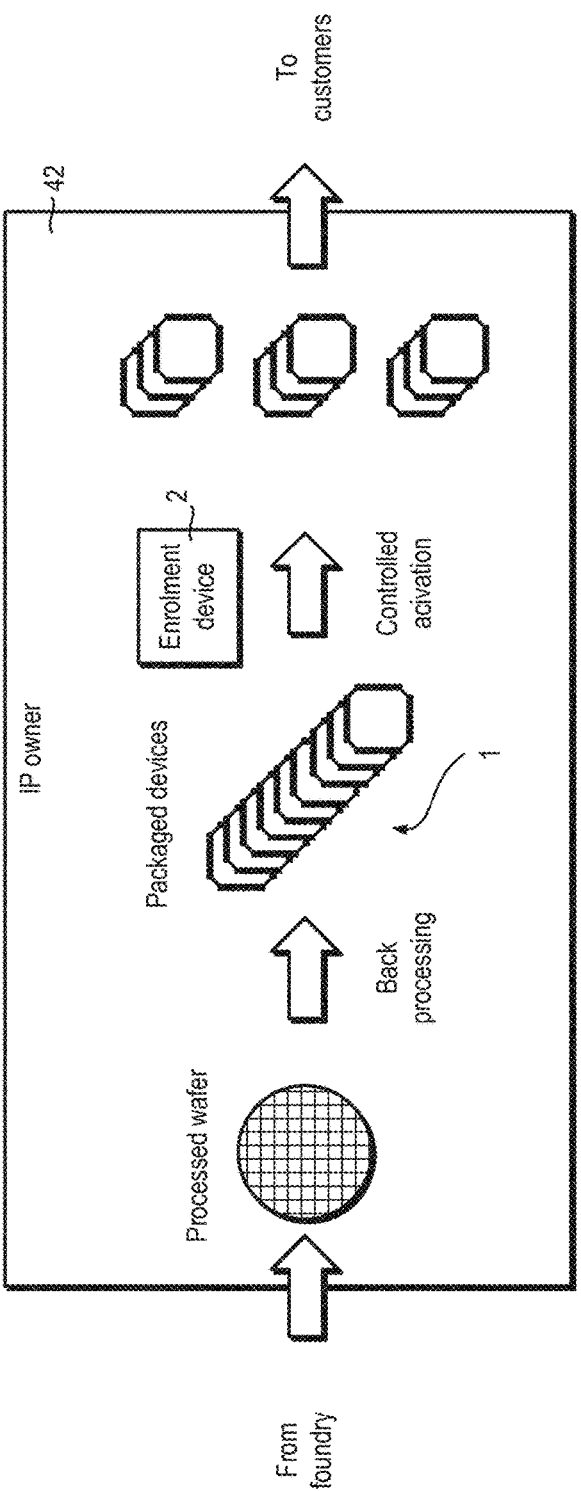
Fig. 14

INTEGRATED CIRCUIT WITH PARTS ACTIVATED BASED ON INTRINSIC FEATURES

The present invention relates to a fixed logic integrated circuit, such as a microcontroller or a system-on-a-chip.

Certain features of some integrated circuits can be enabled or disabled through a process known as "featurization". For example, featurization can be used to configure a wide variety of different functions and device properties, such as operating voltage, maximum clock operating frequency, memory capacity and availability of a number of peripheral modules, such as communication ports, timers and the like.

Featurization offers a cheap and easy way to provide a range of differently-featured integrated circuits having a fixed set of features present on chip from those having a full set of features (herein referred to as "fully-featured integrated circuits") to others having fewer features (herein referred to as "variants").

Featurization involves programming a device configuration file in non-volatile memory which is then used by a feature activation function to enable or disable features. Access to the non-volatile memory may be controlled using a configuration access key which is defined during integrated circuit manufacture. If a programming tool does not have the correct key, then it cannot program the device configuration file.

However, if the key is compromised, then the featurization process can be undermined. For example, if an unauthorized user has access to the key, then they can use a device configuration file to create fully-featured integrated circuits.

Arrangements for protecting intellectual property (IP) cores in programmable logic devices, such as field programmable gate array (FPGAs) are known.

For example, U.S. Pat. No. 8,427,193 B1 concerns protecting IP cores incorporated into circuit designs implemented in programmable integrated circuits, such as FPGAs. US 2011/113392 A1 describes a method of protecting an IP core. WO 2008/125999 A2 describes controlled activation of at least one function in a product or a component such as an FPGA or software module. WO 2009/024913 A2 describes generating a response to a physically unclonable function which is uniquely representative of the identity of a device having challengeable memory, such as an FPGA. GB 2 268 605 A concerns a method of providing functional options to purchasers of computer-type systems, such as a telephone switching system.

Reference is also made to Jorge Guajardo et al: "FPGA Intrinsic PUFs and Their Use for IP Protection", Cryptographic Hardware and Embedded Systems—CHES 2007, pages 63 to 80 (2007) and to Jorge Guajardo et al: "Physically Unclonable Functions and Public-Key Crypto for FPGA IP Protection", Field Programmable Logic and Applications, 2007—FPL 207, pages 189 to 195 (2007).

SUMMARY

According to a first aspect of the present invention there is provided a fixed logic integrated circuit. The integrated circuit comprises a unique code generator configured to generate a code having a value which is intrinsically unique to the integrated circuit and an enrolment pattern generator configured to generate an enrolment pattern based on the unique code. The code is preferably generated on demand and is transitory. The integrated circuit may comprise memory for storing remotely-generated enabling data (generated using the enrolment pattern and remotely-stored configuration data). The integrated circuit comprises a configuration file generator configured to generate configuration data using the remotely-generated enabling data and the unique code. The integrated circuit comprises a feature activation module configured to activate and/or disable features of the integrated circuit and/or customise the integrated circuit in dependence upon the configuration data.

This can help to provide tighter control over featurization of a fixed logic integrated circuit, such as microcontroller, since a set of configuration data is generated at the integrated circuit and depends on having both the unique code for the integrated circuit and a corresponding set of enabling data which is provided specifically for that integrated circuit. Thus, if a set of enabling data is intercepted and copied, then it cannot be used to activate features of another, different fixed logic integrated circuit.

Moreover, it can provide a way for a fab-less or fab-light integrated circuit manufacturer to monitor production taking place at a semiconductor foundry since information identifying each manufactured integrated circuit and its respective enabled feature set can be gathered. This can help to reduce or prevent overproduction.

Herein, the term "featurization" is intended to include not only featurization, but also customisation, such as trimming and identity initialization. Thus, in some circumstances, featurization need not necessarily involve enabling or disabling specific features. However, in certain circumstances, featurization may exclusively involve enabling or disabling specific features, i.e. without any trimming or identity initialization. In other circumstances, featurization may involve enabling or disabling specific features and trimming and/or identity initialization.

The enrolment pattern preferably contains at least part of the unique code in encrypted form.

The unique code generator is preferably a physical unclonable function (PUF). The physical unclonable function may be an SRAM physical unclonable function.

The enrolment pattern generator is preferably configured to remove noise from the code. The enrolment pattern generator may be configured to encrypt the enrolment pattern and the integrated circuit may be configured to transmit the enrolment pattern in encrypted form to the external enrolment device.

The configuration module may be configured to activate a set of features in dependence upon configuration data. The configuration module is configured to activate a set of peripheral modules (such as universal asynchronous receiver/transmitters (UARTs) or analogue-to-digital converters (ADCs)), in dependence upon the configuration data. The configuration module may be configured to set a clock speed in dependence upon the configuration data.

The feature activation module may be configured to activate a minimum set of features in response to incorrect configuration data. The minimum set of features may include modules which allow featurization. Preferably, the minimum set of features mainly or only include modules which are only or primarily used in featurization. For example, the unique code generator, the enrolment pattern generator, the configuration file generator and the feature activation module may be included in a minimum set of features. The unique code generator, the enrolment pattern generator, the configuration file generator and the feature activation module respective fixed-logic modules preferably comprise fixed-logic modules.

The integrated circuit may be a digital integrated circuit. The integrated circuit may include memory. The memory may be volatile memory such as DRAM or SRAM. The memory may be non-volatile memory, such as EPROM, EEPROM, NOR flash or NAND flash. The integrated circuit may be a micro integrated circuit, such as a microprocessor, microcontroller or signal processing chip. The integrated circuit may be a microcontroller with embedded Flash memory. The integrated circuit may be a processor without embedded Flash memory. The integrated circuit may be a system-on-a-chip (SoC). The integrated circuit may a logic integrated circuit, such as application-specific integrated circuit chip, standard logic or display driver.

According to a second aspect of the present invention there is provided an enrolment device. The enrolment device (which may be implemented in software on a computer system) comprises configuration data for configuring an integrated circuit and an enabling data generator configured to generate enabling data for the integrated circuit using the configuration data and an enrolment pattern generated at the integrated circuit.

According to a third aspect of the present invention there is provided a system comprising the integrated circuit and the enrolment device. The integrated circuit and the enrolment device may be in secure (i.e. encrypted) communication. The party (e.g. a semiconductor foundry) sending the enrolment pattern may be authenticated by the enrolment device using a certificate or other authenticating means.

According to a fourth aspect of the present invention there is provided a method of enrolling an integrated circuit. The method comprises generating a code having a value which is unique to the integrated circuit. The method comprises generating an enrolment pattern based on the unique code and sending the enrolment pattern to an external enrolment device. The method comprises receiving enabling data from the enrolment device. The method may comprise storing the remotely-generated enabling data on-chip (i.e. on the integrated circuit).

The method may comprise storing the remotely-generated enabling data off-chip (i.e. in external memory).

The method of enrolling an integrated circuit may be a hardware-implemented method.

According to a fifth aspect of the present invention there is provided a method of configuring an integrated circuit. The method comprises generating configuration data using remotely-generated enabling data and a code having a value which is unique to the integrated circuit. The method comprises activating and/or deactivating features of the integrated circuit in dependence upon the configuration data.

The method may comprise retrieving the enabling data from external memory.

Configuring the integrated circuit may be performed each time the integrated circuit starts up.

The method of configuring the integrated circuit may be a hardware-implemented method.

BRIEF DESCRIPTION OF THE DRAWINGS

Certain embodiments of the present invention will now be described, by way of example, with reference to the accompanying drawings, in which:

FIG. 12 is a table of some examples of activation patterns;

FIG. 14 illustrates device enrolment in a fab-light manufacturing environment.

DETAILED DESCRIPTION OF CERTAIN EMBODIMENTS

Figure 1:
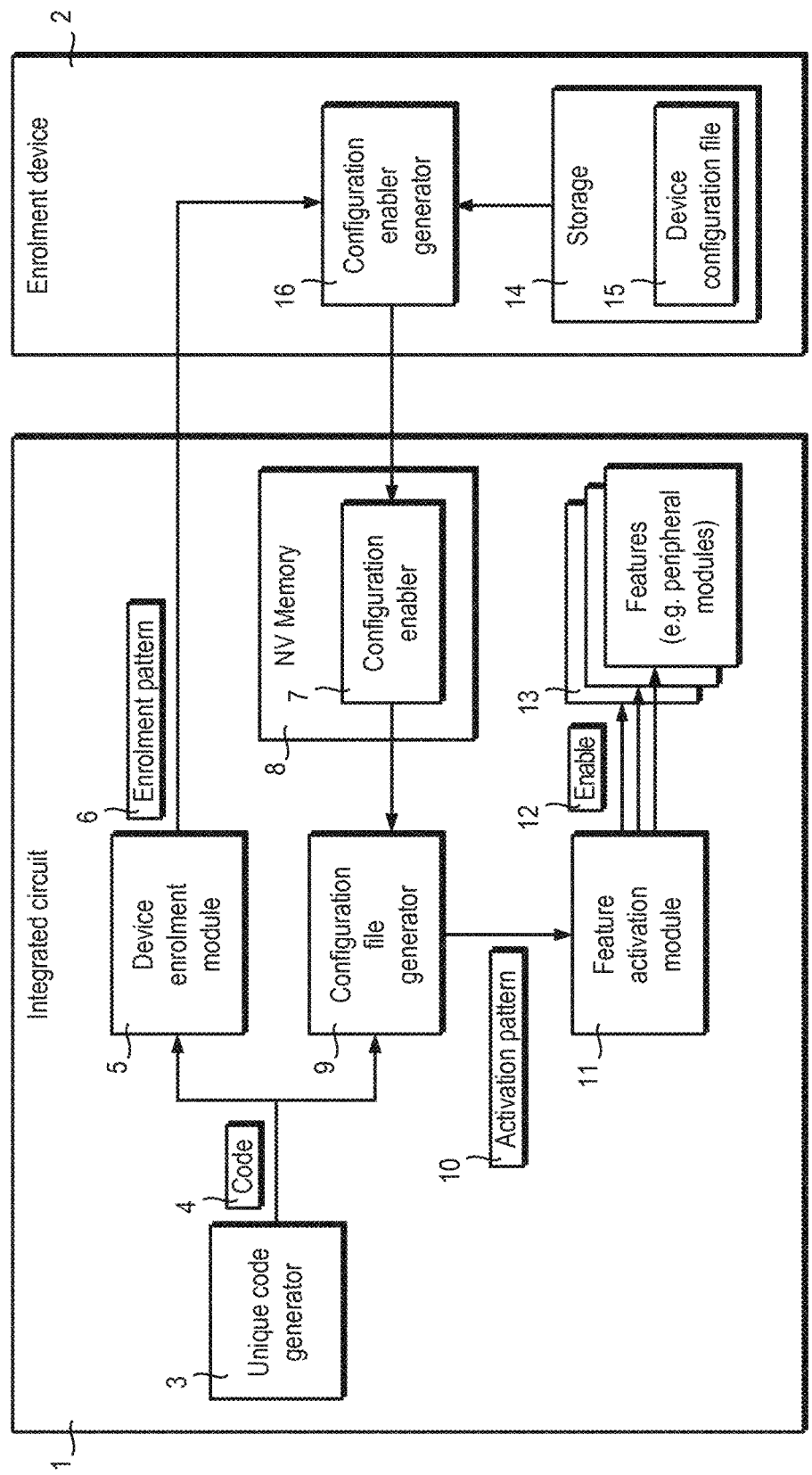
FIG. 1 is a schematic block diagram of an integrated circuit and an external enrolment device.

Referring to FIG. 1, an integrated circuit 1 and an external enrolment device 2 are shown. The integrated circuit 1 is a fixed logic device (as opposed to a programmable logic device). Thus, the integrated circuit 1 includes logic circuits and other modules whose functions are fixed at time of fabrication, but which can be individually selectably enabled or disabled, and/or customised, after fabrication.

The integrated circuit 1 includes a unique code generator 3 for reproducibly generating a code 4 which is intrinsically unique to the integrated circuit 1. The unique code generator 3 is based on a physical unclonable function (PUF). The unique code 4 depends on the physical properties that are intrinsic to an element in the integrated circuit 1. For example, the unique code generator 3 may generate the unique code 4 using a value at startup of a memory element. The code 4 is unique to the integrated circuit 1 even with respect to other integrated circuits (not show) having the same design and fabricated at same time using the same set of masks (not shown). The code 4 is generated on demand and is transitory. In other words, the code 4 is not generated and then permanently stored. An initialized serial number or other initialized root-of trust is not used as the unique code 4.

The integrated circuit 1 includes a device enrolment module 5 for generating an enrolment pattern 6 using the unique code 4. In an enrolment stage, the integrated circuit 1 transmits the enrolment pattern 6 to the enrolment device 2 and, in return, receives a configuration enabler 7 (herein also referred to as "code constructor data" or "helper data"). The integrated circuit 1 does not transmit the original (i.e. noisy) unique code 4 to the enrolment device 2 in the clear. Thus, the original unique code 4 does not leave the integrated circuit 2. Instead, only a processed code, such as an enrolment pattern 6 which may be encrypted, is transmitted. The integrated circuit 1 may include non-volatile memory 8 for storing the configuration enabler 7 and a configuration file generator 9 for generating a feature activation pattern 10 using the unique code 4 and the configuration enabler 7. The integrated circuit 1 includes a feature activation module n which generates enable and/or disable signals 12 for enabling and/or disabling integrated circuit features 13 (herein referred to simply as "features"). A feature may be a peripheral module, such as a universal asynchronous receiver/transmitter (UART) or analogue-to-digital converter (ADC). A feature may be a parameter, such as a clock speed.

The enrolment device 2 includes storage 14 which stores a device configuration file 15 for the integrated circuit 1 and a configuration enabler generator 15 for generating the configuration enabler 7.

The configuration enabler 7 is generated specifically for the integrated circuit 1 and an activation pattern 10 can only be generated using the configuration enabler 7 and the code 4 which was used to create the configuration enabler 7. Furthermore, the activation pattern 10 is generated on-chip, as-and-when required. Thus, this can help provide tighter control of featurization.

Figure 2:
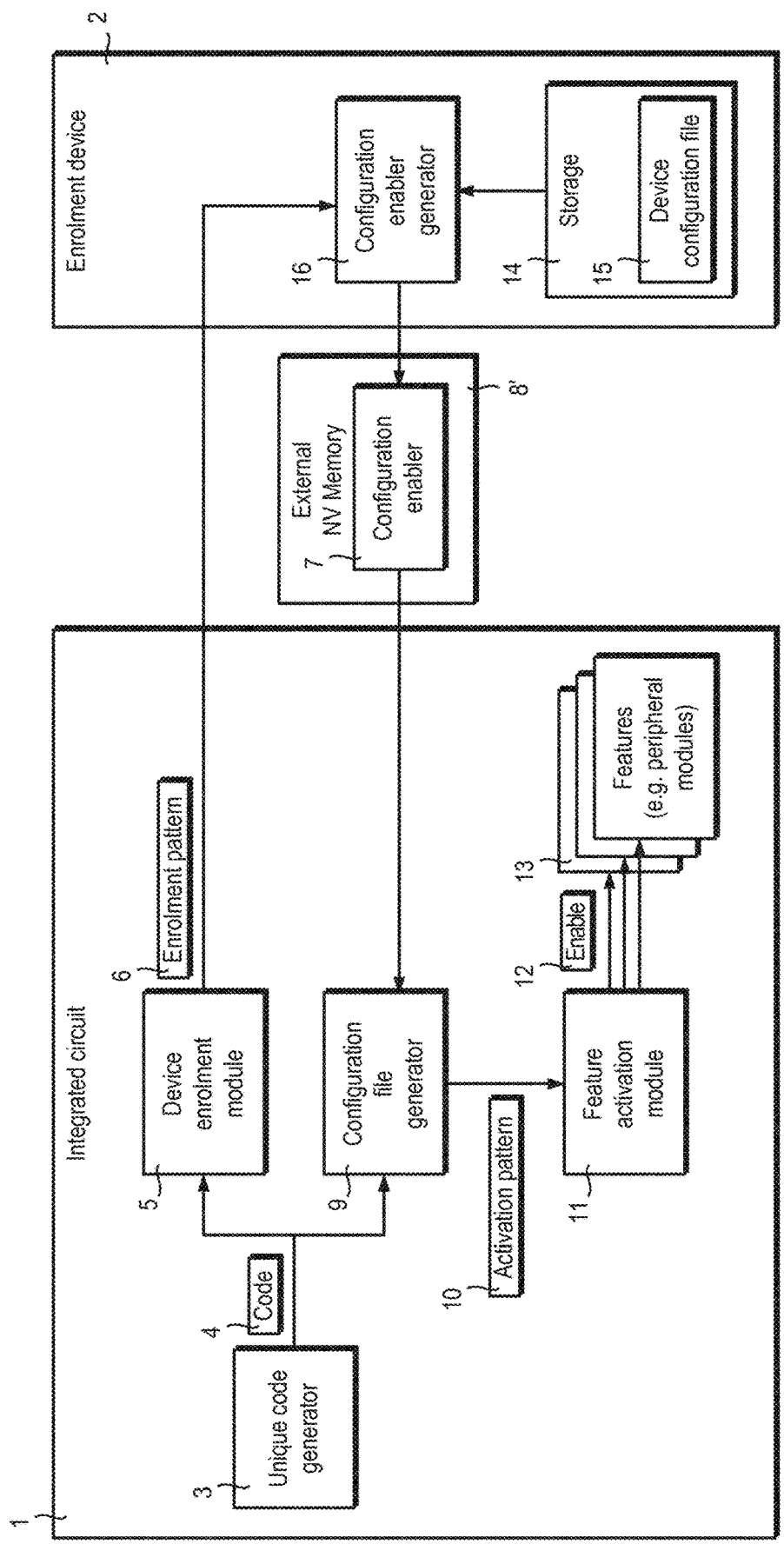
FIG. 2 is a schematic block diagram of an integrated circuit, external memory and an external enrolment device.

Referring to FIG. 2, the integrated circuit 1 may be provided with external non-volatile memory 8' for storing the configuration enabler 7. Thus, the integrated circuit 1 need not include on-chip non-volatile memory 8.

Figure 3:
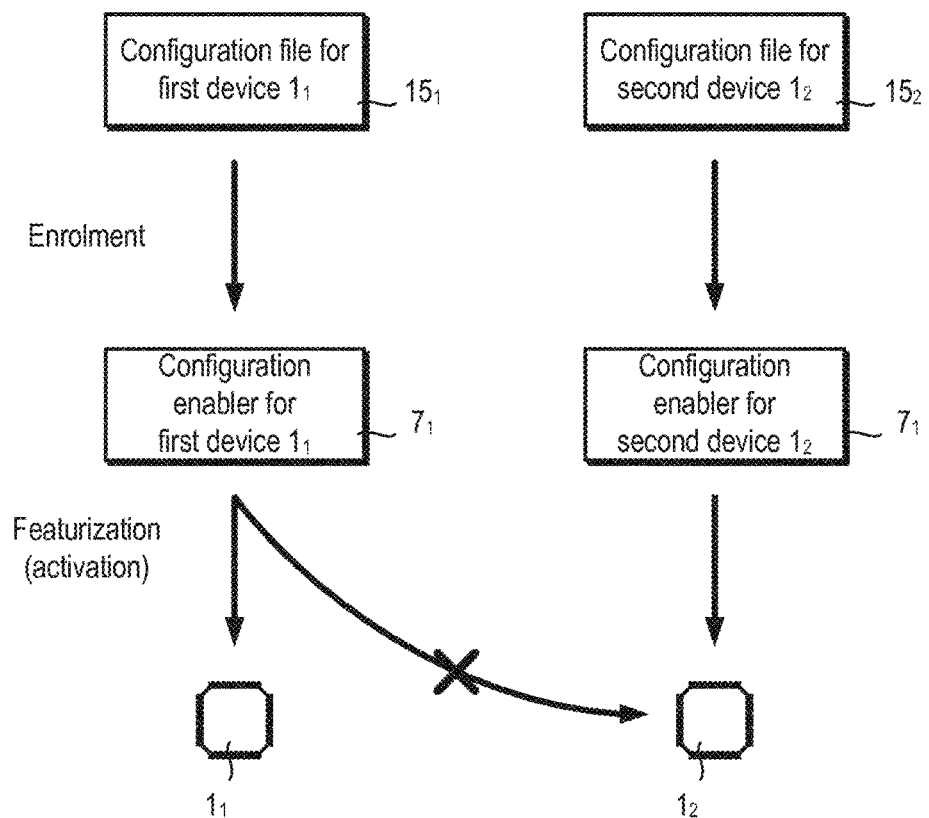
FIG. 3 is a schematic block diagram of a microcontroller or system-on-a-chip.

Referring to FIG. 3, first and second integrated circuits 1₁, 1₂ are shown. The first integrated circuit 1₁ is intended to be a fully-featured integrated circuit and the second integrated circuit 1₂ is intended to be a partially-featured integrated circuit, i.e. one in which fewer functions are enabled than a fully-featured integrated circuit.

Featurization of the first and second integrated circuits 1₁, 1₂ is set by respective first and second device configuration files 15₁, 15₂. The first and second device configuration files 15₁, 15₂ are generated specifically for the first and second integrated circuits 1₁, 1₂.

Thus, even if the first configuration enabler 1₁ is copied, it cannot be used for featurization of the second integrated circuit 1₂, let alone to enable a full set of features.

Referring again to FIG. 1, at least some fixed logic features of the integrated circuit 1 are activated and operational after production and before featurization. Thus, prior to enrolment, the integrated circuit 1 is at least partially featurized (or "partially activated"). In particular, the code generator 3, the device enrolment module 5, the configuration file generator 9 and feature activation module 11 are fixed logic modules which are activated and operational.

Figure 4:
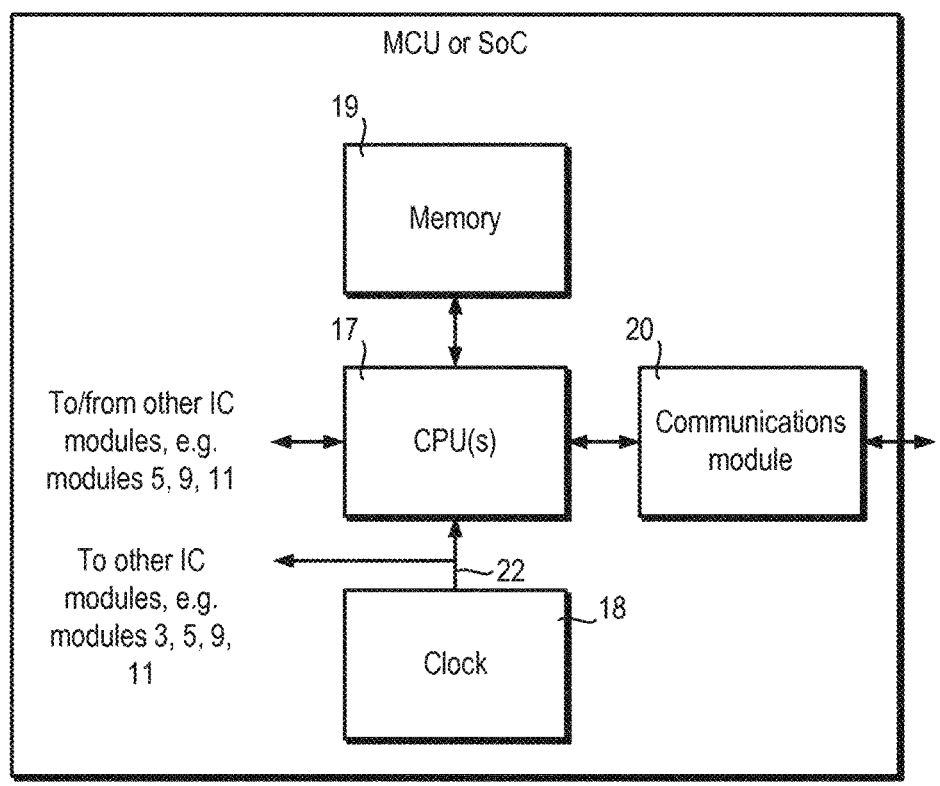
FIG. 4 illustrate pre-activated features of an integrated circuit.
Figure 5:
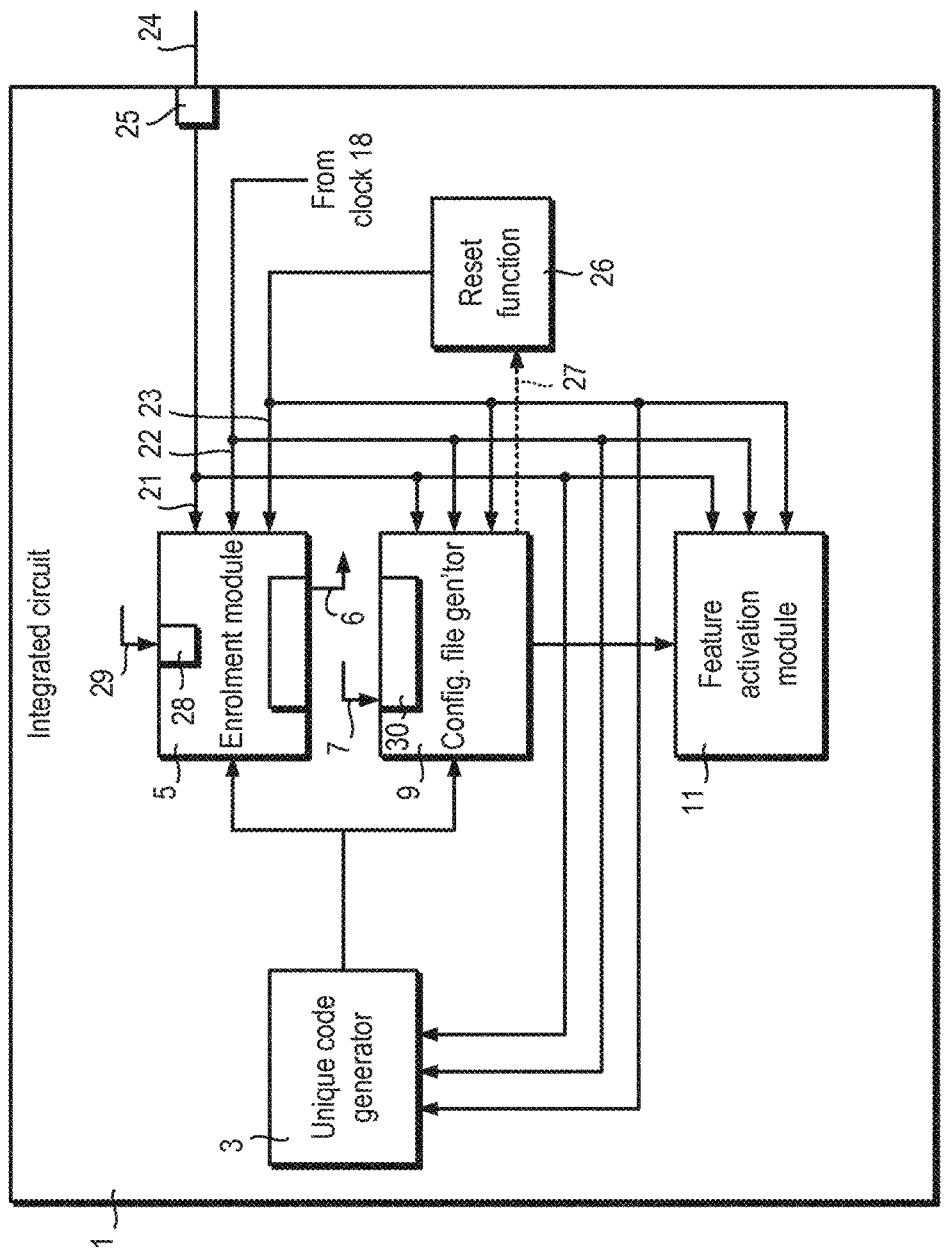
FIG. 5 illustrates control of featurization.

Referring to FIG. 4, in a microcontroller or system-on-a-chip 1, at least one central processing unit 17, a clock 18 which may operate at a limited clock speed, that is, below the fastest available (i.e. fastest featurizable) clock speed, memory 19 whose available size may lie below a maximum available and a communications peripheral module 20 are active and operational to allow featurization Referring also to FIG. 5, voltage supplies 21, clock signal 22 and reset signals 23 and to the code generator 3, the device enrolment module 5, the configuration file generator 9 and feature activation module n (herein referred to as the "pre-activated on-chip modules") are not controllable by the central processing unit(s) 17 or other processing units, such as a direct memory access module, on the integrated circuit 1. Thus, supply voltage and clocks signal lines 21, 22 to the pre-activated on-chip modules 3, 5, 9, 11 are protected. In other words, a processing element cannot switch on or off or vary supply voltages and clocks to the pre-activated on-chip modules 3, 5, 9, 11. For example, internal (i.e. on-chip) supply voltages 21 may be obtained, e.g. fed directly, from an external supply voltage 24 provided to the integrated circuit 1 via pin 25 and the clocks signals 23 may be generated on-chip. Furthermore, a reset signal 23 to the pre-activated on-chip modules 3, 5, 9, 11 may be generated by a reset function 26 in response to a restricted set of circumstances, such as at the end of start-up or in response to an error signal 27 being generated by the configuration file generator 9. The reset function 26 and the error signal 27 are protected. Thus, a processing element (such as the central processing unit 17) cannot freely generate or manipulate the error signal 27 except in certain circumstances, if at all. The reset function 26 may be implemented hardwired.

The pre-activated on-chip modules 3, 5, 9,11 preferably take the form of specific on-chip circuits.

The code generator 3 does not have any interfaces which accessible by a central processing unit 17 or other processing unit. The code generator 3 preferably has one input interface and one output interface, the output interface coupled directly to the device enrolment module 5 and the configuration file generator 9. Limiting the number of interfaces can help to prevent or discourage manipulation or alteration of the code 4 by the central processing unit(s) 17 or other processing elements or units. The input/output interfaces can take different forms depending on the PUF used to implement the code generator 3. For example, in case of an SRAM PUF, the interfaces can be address and data lines to SRAM memory (not shown) that will be used as the source of noisy data.

Preferably, the code generator 3 embed circuits (not shown) to protect it against manipulation by an external voltage 24 which might influence or manipulate the generation of code 4. Furthermore, circuits (not shown) may be provided to automatically recalibrate a source of noisy data so that it does not vary over time. Such a circuit can, for instance, dynamically switch off the supply voltage within the code generator 3 whenever it is not used by the device enrolment module 5 and the configuration file generator 9.

The device enrolment module 5 has one input interface 28 for a signal 29 which allows a central processing unit 17 or other processing element to trigger generation of the enrolment pattern 6. The device enrolment module 5 has one output interface 29 in the form of one or more registers that allows the central processing unit 17 or other processing unit (such as a DMA) to read-out, in one or more operations, the enrolment pattern 6. The device enrolment module 5 may provide status information (not shown) to the central processing unit 17 or other processing unit to indicate when the generation of the enrolment pattern 6 has been completed.

The device enrolment module 5 may process the code 4 by removing noise from the code 4 before processing it further, e.g. by applying encryption.

Referring also to FIG. 1, the enrolment pattern 6 generated for an integrated circuit 1, such as a specific microcontroller or system-on-a-chip, contains sufficient information for the configuration enabler generator 16 to generate a configuration enabler 7 bound to the integrated circuit 1. Eavesdropping the enrolment pattern 6 does not provide enough information for a potential attacker to retrieve the code 4. The enrolment pattern 6 may be protected further against potential manipulation in such a way that any such manipulation can be detected by the configuration enabler generator 16. The enrolment pattern 6 may further be encrypted with a key shared with configuration enabler generator 16.

The configuration enabler generator 16 is implemented in a high-security tamper-resistant Hardware Security Module (HSM) that serves as the enrolment device. The installation and the maintenance of this generator 16 is controlled and handled by the IC manufacturer. The device configuration file 15 is stored securely in the HSM and its installation and maintenance is be controlled and handled by the IC manufacturer.

Referring still to FIG. 1, the configuration enabler 7 contains sufficient information for the configuration file generator 9 to transform the code 4 into an activation pattern 10. An attacker knowing a configuration enabler 7 and the associated enrolment pattern 6 does not have sufficient information to reconstruct the generation algorithm processed in the configuration enabler generator 16. The configuration file generator 9 may also be arranged to detect whether the configuration enabler 7 has been manipulated. The configuration enabler generator 16 may encrypt the configuration enabler 7 with a key shared with configuration file generator 9.

The configuration file generator 9 has an input interface 30 in the form of one or more registers that allows a central processing unit 17 or other processing element (such as a DMA) to write-in, in one or more operations, the enrolment pattern 6 the configuration enabler 7. The configuration file generator 9 may provide status information (not shown) to the central processing unit 17 or other processing element to indicate successful generation of the activation pattern 10 and/or when an error occurs.

The configuration file generator 9 outputs the activation pattern 10 directly to the feature activation module 11. The feature activation module 11 has no input interface that can be used a central processing unit 17 or other processing element. This can help to discourage or prevent manipulation of the activation pattern 10.

After the integrated circuit 1 has started operation, for example following a reset, the configuration enabler 9 can generates an activation pattern 10 having a default value (herein referred to as the "default activation pattern") which results in either no features 13 being activated or a few, predefined features 13 being activated, such as a communication module.

The feature activation module n outputs a set of independent signals 12 to enable (or "activate") or disable a one or more feature 13, e.g. a peripheral module. Each enable (or disable) signal 12 is connected to an enable input (not shown) of at least one peripheral module, such as a communication interface module, a timer, a graphical processing unit or the like.

Each enable (or disable) signal 12 can be coupled with a user-configurable enable signal (not shown) using an AND gate (not shown). The enable (or disable) signal 12 are arranged such that they cannot be directly manipulated by a central processing unit 17 or other processing unit.

If a feature 12 is disabled, then the feature 12 does not operate. Consequently, any attempt by a central processing unit 17 or other processing unit leads to unexpected behaviour, such as no communication, no timer tick, no graphical processing, and so on.

If a default activation pattern 10 is provided after reset, then the feature activation module 11 can disable all features 13 or all but a few features 13. Thus, even if a set of features 13 in an integrated circuit 1 may have previously been enabled, those features 13 may be subsequently disabled following a reset, prior to reactivation.

The output of feature activation module 11 may also include a set of one or more multiple-bit registers (not shown) providing integer values. These registers may provide partial or complete configuration information to integrated circuit resources, such as memory address boundaries, clock multipliers or the like. The registers (not shown) are arranged such that they cannot be manipulated by a central processing unit 17 or other form of processing unit. If a default activation pattern 10 is provided after reset, then the feature activation module 11 can lead to a minimal device configuration, for example, opening a limited memory space, providing a minimum-value clock multiplier and so on.

Featurization using device-intrinsic parameters is generally divided into two stages, namely enrolment and feature activation stages.

Enrolment

Figure 6:
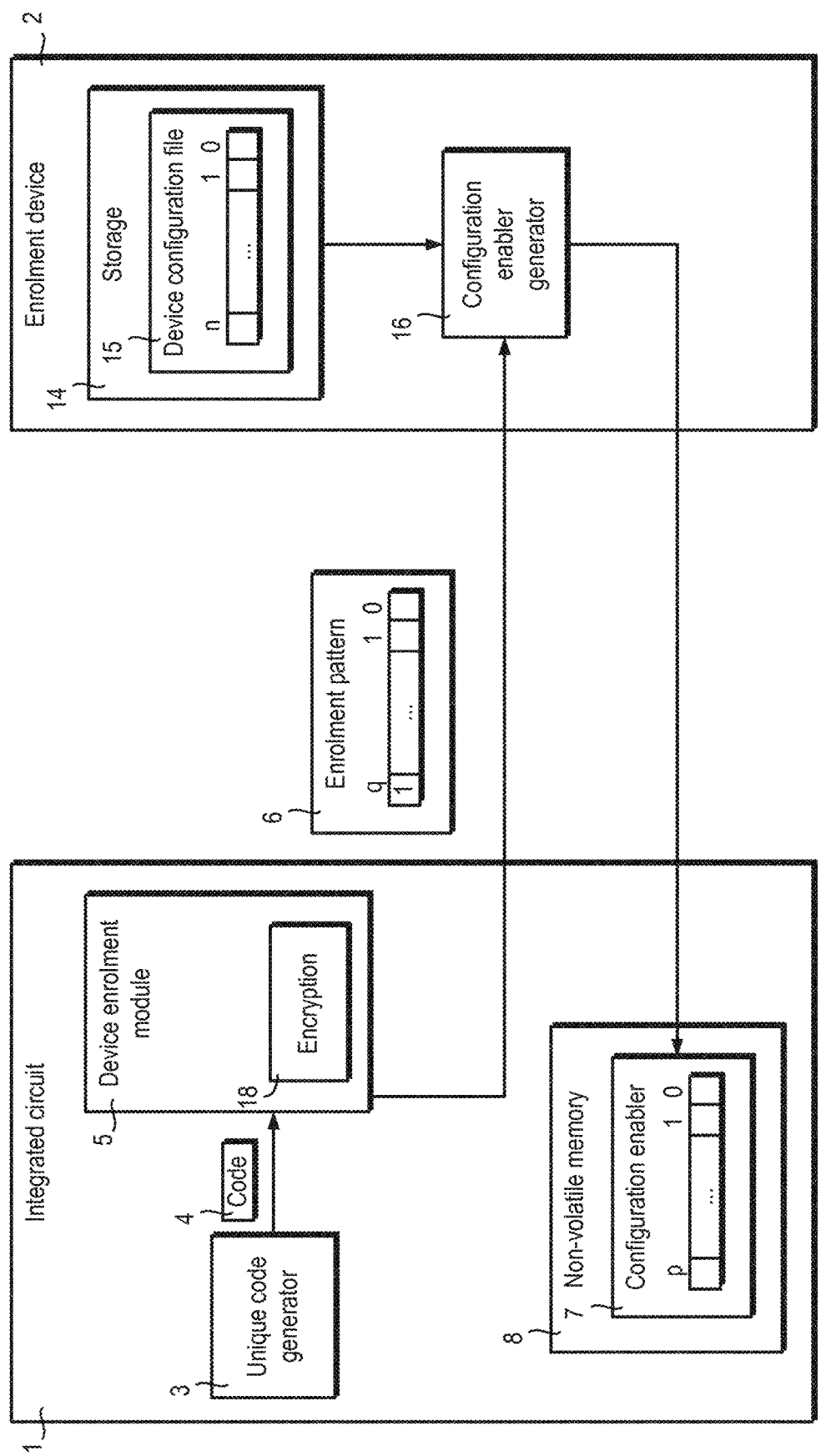
FIG. 6 is a schematic block diagram of modules involved in enrolment.
Figure 7:
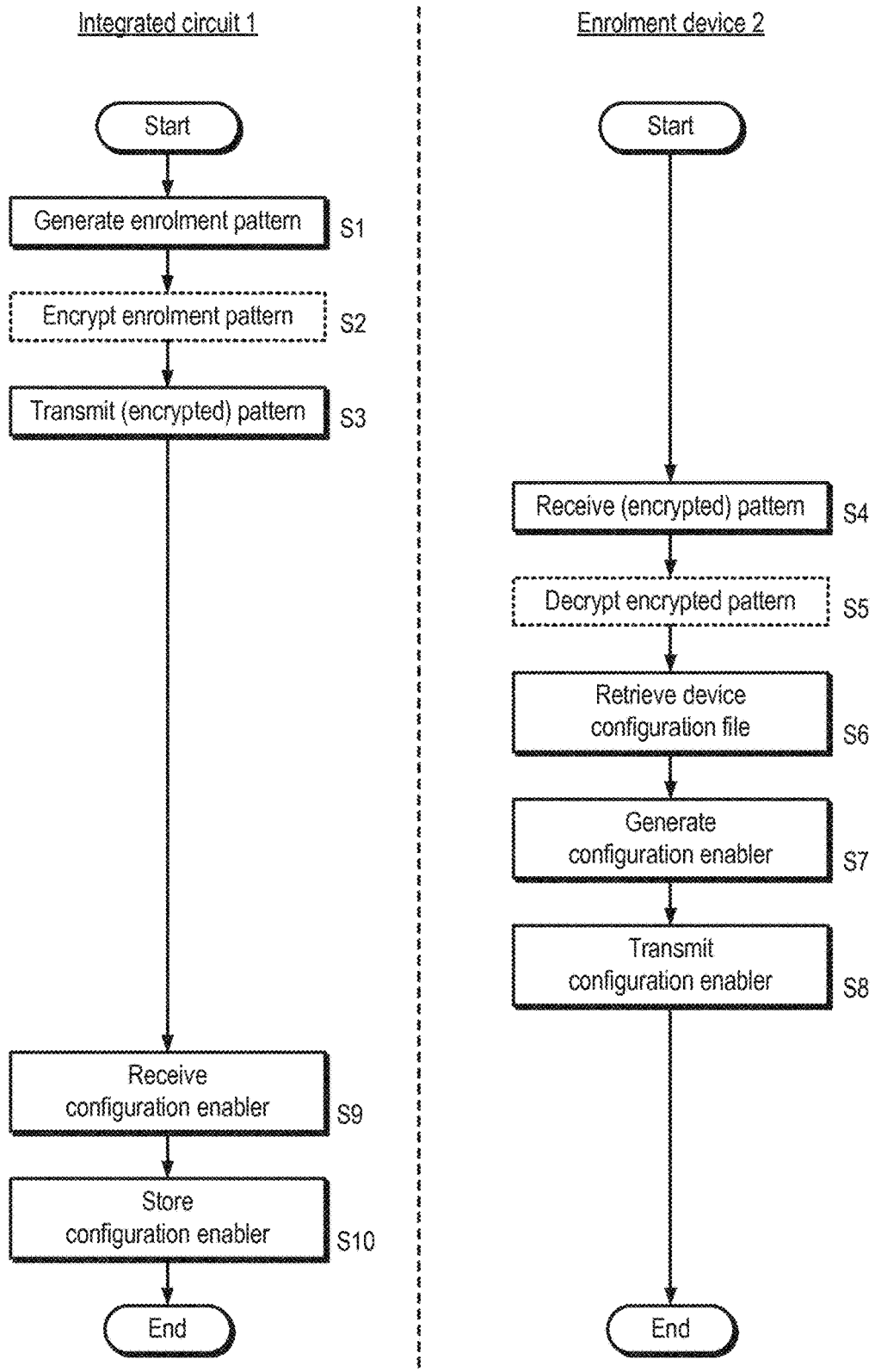
FIG. 7 is a process flow diagram of a method of enrolment.

Referring to FIGS. 6 and 7, a process of device enrolment is shown.

In the integrated circuit 1, the device enrolment module 5 obtains a unique code 4 from the code generator 3 removes noise from the code 4 and generates an enrolment pattern 6 (step S1). An encryption module 18 may encrypt the enrolment pattern 6 with a public key (not shown) of the enrolment device 2 (step S2). The device enrolment module 5 transmits the enrolment pattern 6 to the enrolment device 2 (step S3). The party (e.g. semiconductor foundry) sending the enrolment pattern 6 may be authenticated by the enrolment device 2 using a certificate (not shown) or other means. The enrolment pattern 6 takes the form of a q-bit integer number.

The enrolment device 2 can take different forms. In this case, the enrolment device 2 takes the form of a programmable Hardware Security Module (HSM).

The enrolment device 2 receives the enrolment pattern 6 (step S4) and, if the code is encrypted, a decryption module (not shown) decrypts the enrolment pattern 6 (step S5). The configuration enabler generator 16 retrieves a device configuration file 15 from storage 14 (step S6). The configuration enabler generator 16 generates a configuration enabler 7 which is specific to the integrated circuit 1 based on the enrolment pattern 6 and the device configuration file 15 (step S7) and transmits the configuration enabler 7 to the integrated circuit 1 (step S8). The configuration enabler 7 takes the form of a p-bit integer number. Preferably, p is at least 32. The larger the values of p and q are, then the more secure enrolment can be made.

The integrated circuit 1 receives the configuration enabler 7 (step S9) and stores the configuration enabler in non-volatile memory (step S10).

Enrolment is carried out once for the integrated circuit 1. The enrolment device 2, however, may enrol many different integrated circuits 1.

Feature Activation

Figure 8:
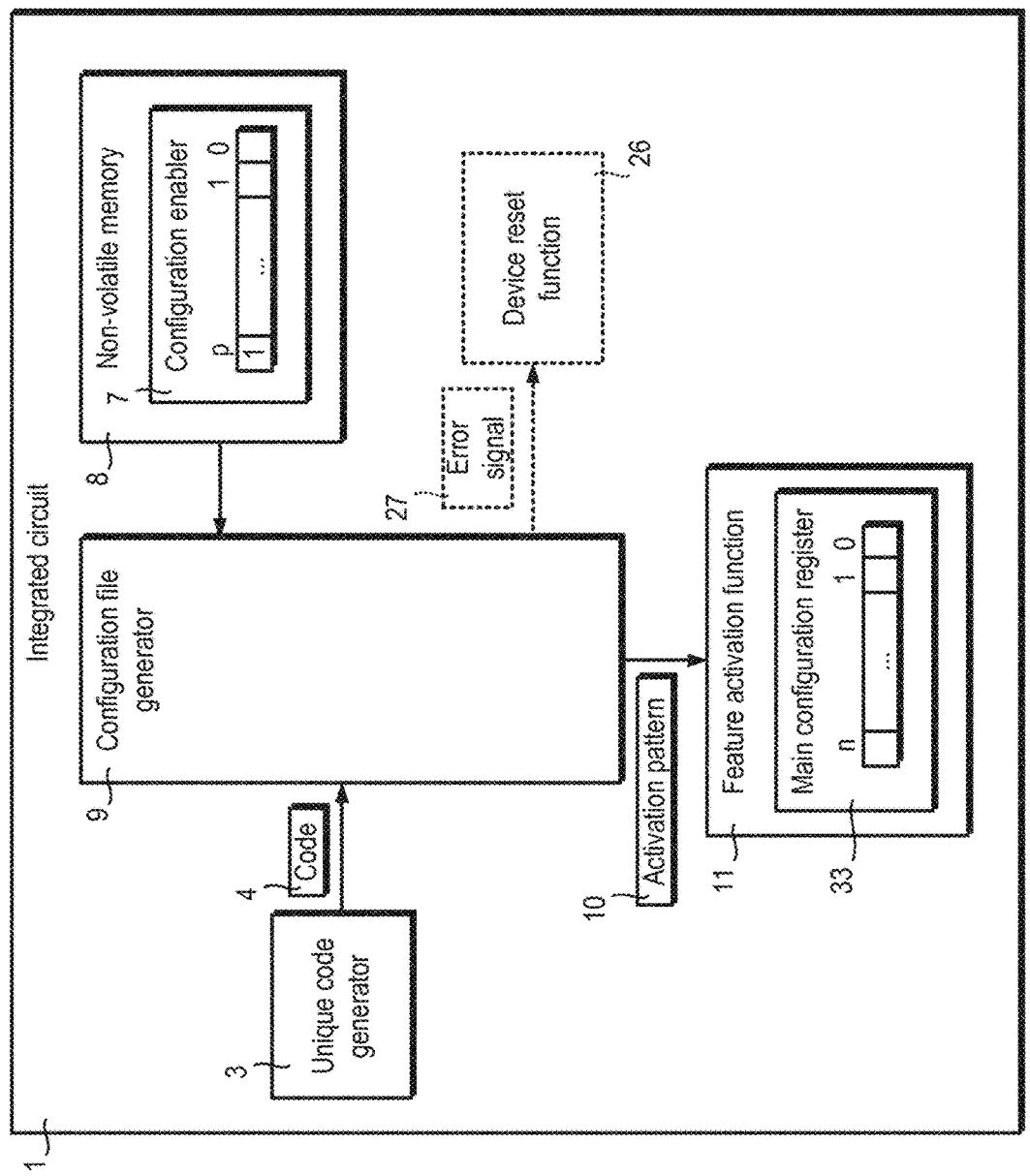
FIG. 8 illustrates on-chip generation of an activation pattern.
Figure 9:
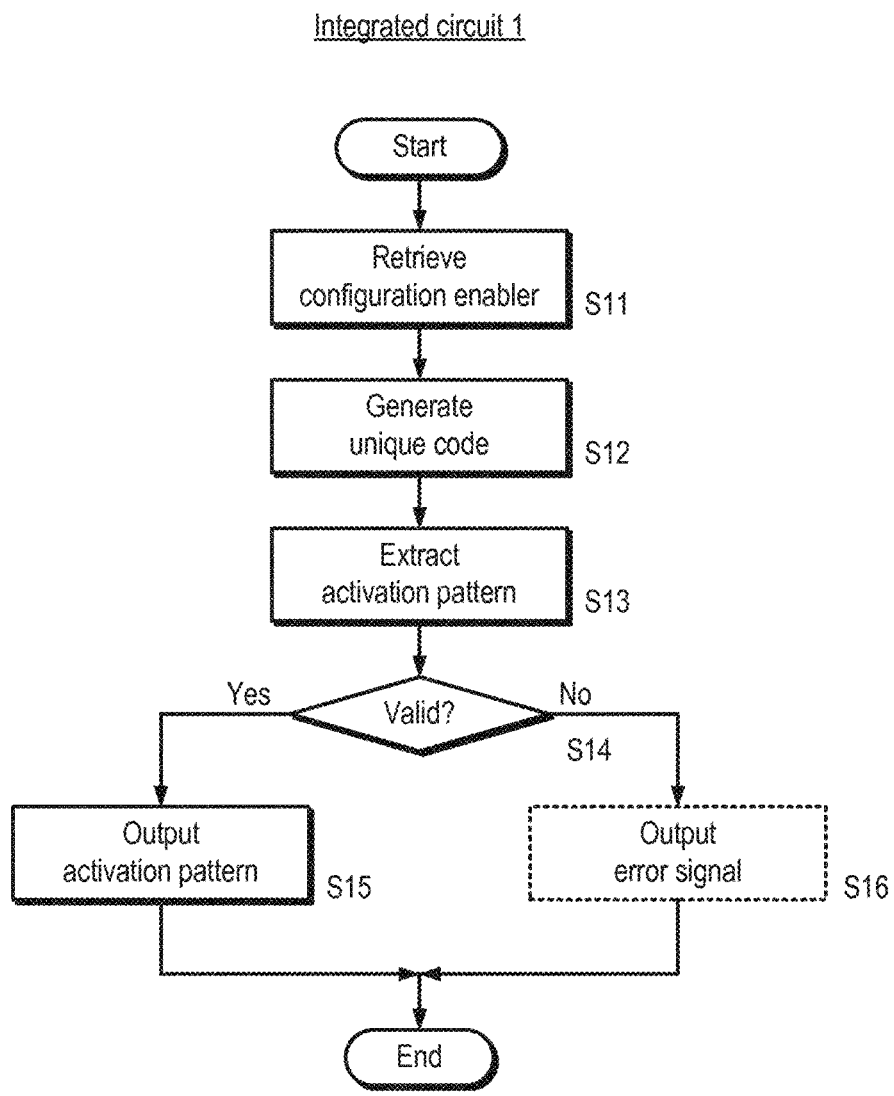
FIG. 9 is a process flow diagram of a method of feature activation.

Referring to FIGS. 8 and 9, a process of feature activation is shown.

After the integrated circuit 1 has been enrolled, feature activation can take place.

Feature activation takes place when the integrated circuit 1 starts up.

The configuration file generator 9 includes a number of functions which allow it exclusively to generate a configuration file in the form of an activation pattern 10 using the unique code 4. The configuration file generator 9 may include a noise reduction unit (not shown), a randomness extractor unit (not shown), a digital pattern extraction unit (not shown) and a post-process unit (not shown).

The configuration file generator 9 retrieves the configuration enabler 7 from memory 8 (step S11). The unique code generator 3 generates another instance of the code 4 (step S12). The configuration file generator 9 extracts an activation pattern 10 using the code 4 and configuration enabler 7 (step S13). The activation pattern 10 takes the form of an n-bit integer number, where n<p.

Only one configuration enabler 7 will generate the correct activation pattern 10 the integrated circuit 1. Thus, configuration file generator 9 can carry out an error check to determine whether the activation pattern 10 is valid (step S14).

If the activation pattern 10 is valid, the configuration file generator 9 outputs the activation pattern 10 to the feature activation module 11 to be stored in a configuration register 25 (step S15).

If, however, the activation pattern 10 is invalid, the configuration file generator 9 may optionally output an error signal 34 (step S16). The error signal 24 may be supplied to a device reset function 27 which can disable the device 1. However, in some cases, the device 1 can operate with a minimal set of functions, for instance all configurable peripheral modules are disabled and a minimum amount of memory is set.

The configuration enabler 7 can be stored off-chip. For example, the integrated circuit 1 may be connected to a separate Flash or EEPROM chip, for example, as shown in FIG. 2. This can allow featurization of integrated circuits which do not have Flash memory.

Examples of Feature Activation

Feature activation can be used to generate signals to enable or disable individual and/or groups of peripheral modules and integer values which fix device parameters such as an address of an upper boundary of memory, dock frequencies and the like.

A simple coding scheme can be used to enable or disable a function. For example, two bit symbol and an AND gate with one inverting input and one non-inverting input can be used. Thus, a symbol having a value of, say, '01' of may result in an activation signal having a value '1' which results in a function being enabled. A symbol having any other value, such as '10', may result in an activation signal having a value '0' which results in a function not being enabled.

Figure 10:
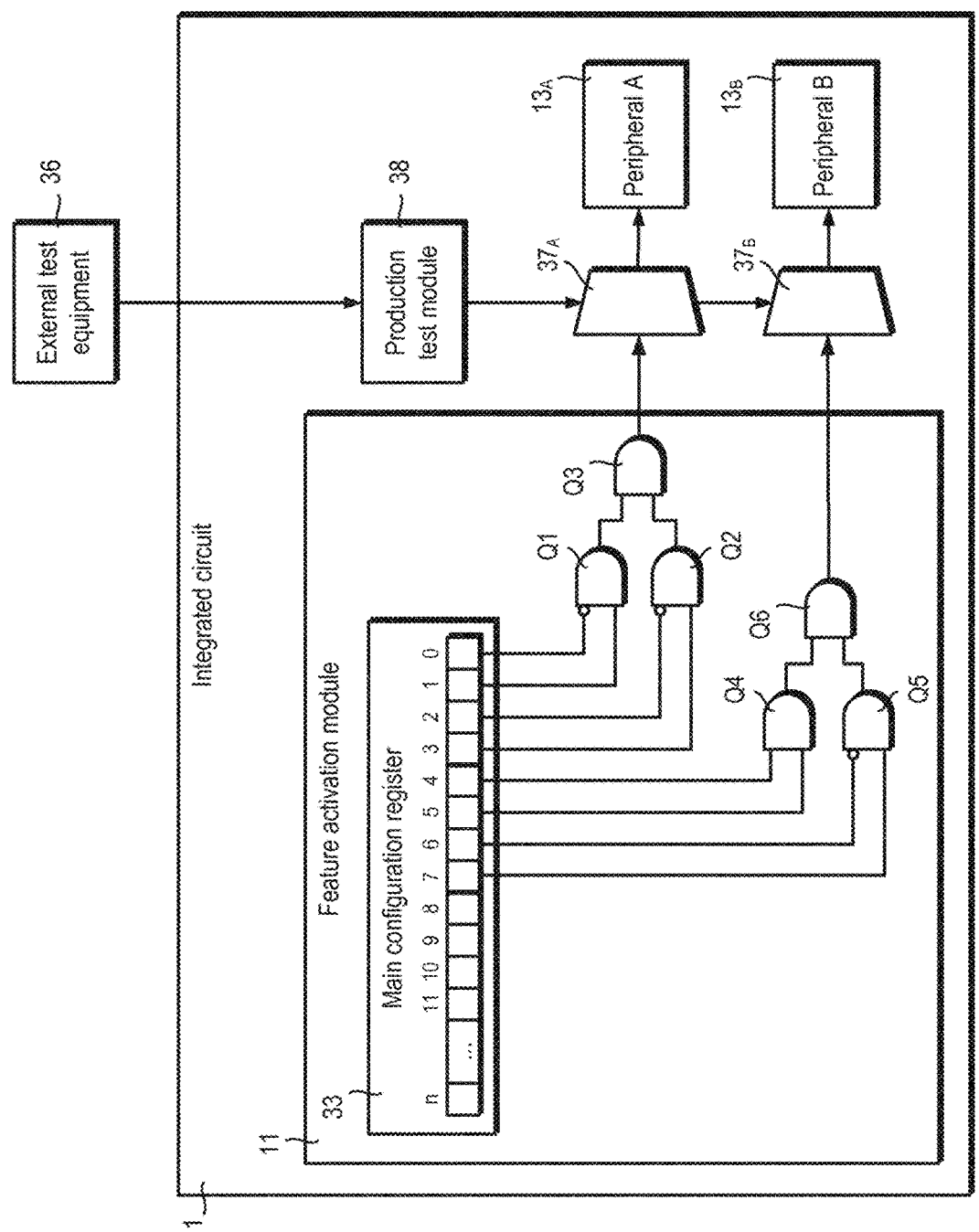
FIG. 10 illustrates multi-bit activation of peripheral modules.

Referring to FIG. 10, an r-bit activation signal may be used, where r>2. For instance, r can take a value 4.

For example, bit numbers 0 to 3 of the main configuration register 33 can be used to control activation of a first peripheral module $13_A$. First, second and third AND gates Q1, Q2, Q3 are used, wherein the first and second AND gates Q1 and Q2 have one inverting input and one non-inverting input. Bit number 0 of the main configuration register 23 is supplied to the inverting input of the first gate Q1. Bit number 1 of the main configuration register 33 is supplied to the non-inverting input of the first gate Q1. Bit number 2 of the main configuration register 23 is supplied to the inverting input of the second gate Q2. Bit number 3 of the main configuration register 33 is supplied to the non-inverting input of the second gate Q2. The outputs of the first and second gates Q1, Q2 are supplies as inputs to the third gate Q3. Thus, a symbol having a value '1010' (hexadecimal 0xA) in bits numbers 3 to 0 will enable a first peripheral module $13_A$. Other values will not enable the peripheral module $13_A$.

Likewise, bit numbers 7 to 4 of the main configuration register 23 can be used to control activation of a second peripheral module $13_B$ using a similar configuration of fourth, fifth and sixth AND gates Q4, Q5, Q6. In this case, only the fifth AND gate Q5 has an inverting input corresponding to bit number 6. Thus, a symbol having a value '0111' (hexadecimal 0x7) in bits numbers 7 to 4 will enable a second peripheral module $13_B$.

To allow external test equipment 26 to control peripheral modules $13_A$, $13_B$, a multiplexer $37_A$, $37_B$ can be provided in series between the feature activation module 11 and each peripheral module $13_A$, $13_B$ controlled by a production test module 38. The production test module 38 can allow the integrated circuit 1 to be tested without the need of an enrolment pattern. The test module 38 is protected to discourage or prevent circumvention of control over feature activation. For example, this may be achieved by using a key (not shown) to control access to the module 38, by blowing the module 38 automatically after use and/or by placing the module 38 in a wafer scribe line (not shown) which will mean that module 38 is destroyed during a subsequent wafer dicing step.

Figure 11:
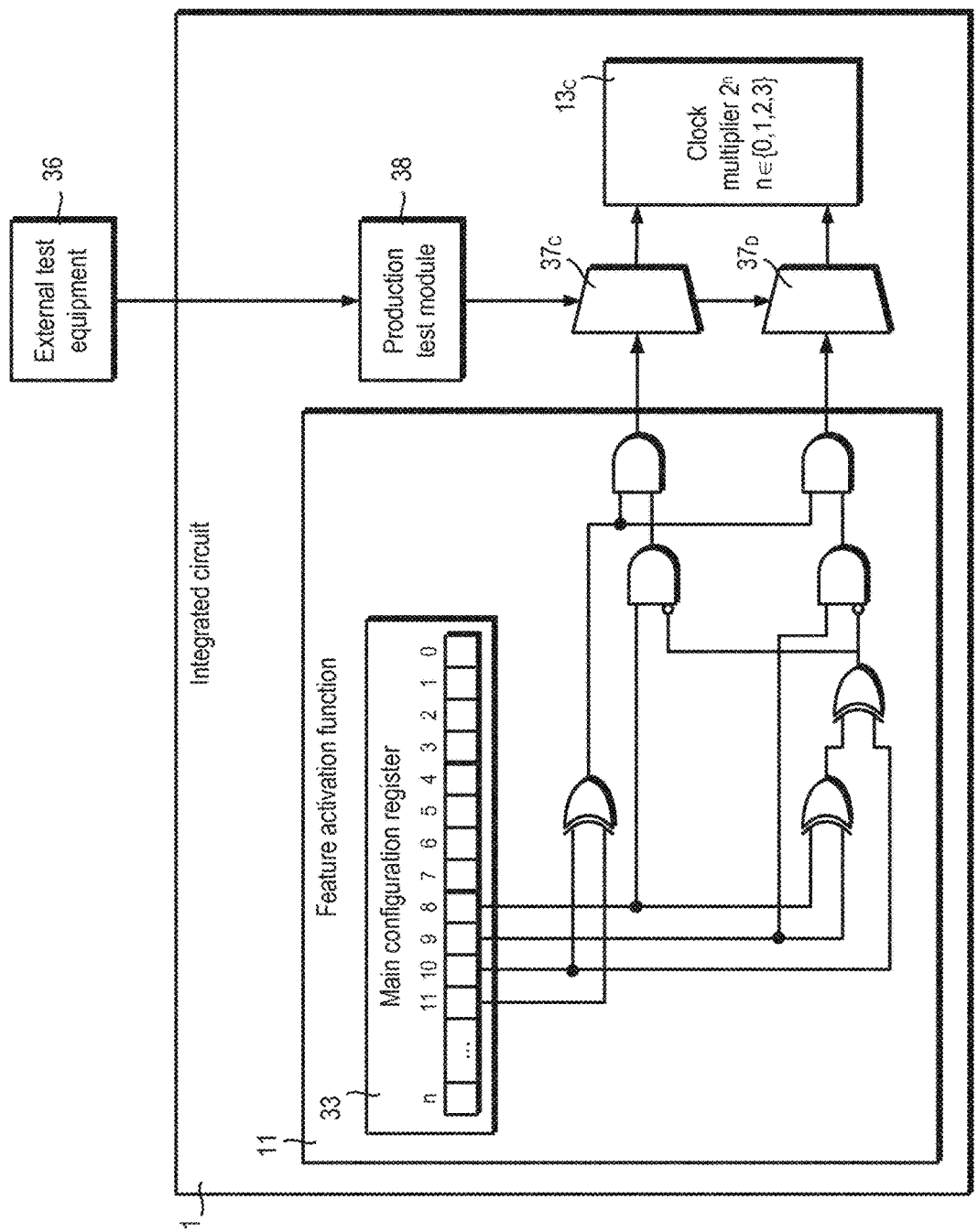
FIG. 11 illustrates setting clock frequency.

Referring to FIG. 11, an r-bit activation signal may be used to control clock speed.

Bit numbers 8 and 9 provide a 2-bit exponent n for a clock multiplier module 39, where n=0, 1, 2 or 3. Bit number 10 is a parity control. Bit number 11 takes a complementary value to bit 10. Using the arrangement of XOR and AND gates, a clock multiplier can be set to 4 using the symbol '0110' (hexadecimal 0x6).

FIG. 12 shows a table 30 which list three possible activation codes for bits 0 to 11 of the main configuration register 33.

Figure 13:
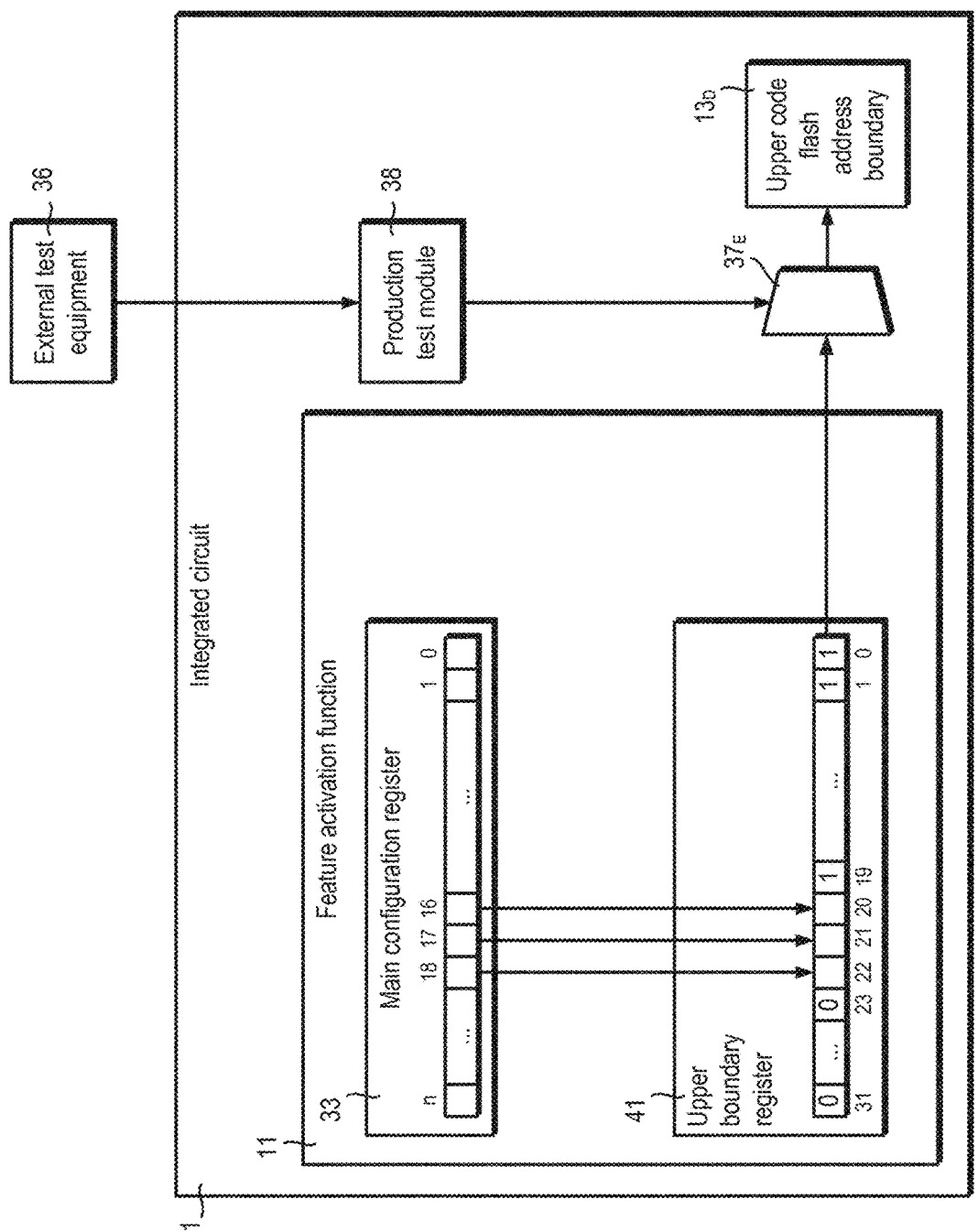
FIG. 13 illustrates setting an upper boundary of memory.

Referring to FIG. 13, a portion of the main configuration register 33 can be copied into another register 31 to provide a parameter. In this example, bit numbers 16 to 18 are copied into bits 20 to 22 of an upper address boundary register 31. Bits 0 to 19 are set to '1' and bits 23 to 31 are set to '0'. Thus, in the case of 8 MB Flash memory having 1 MB granularity, the upper address boundary register 41 can take values of 0x0FFFFF to 0xFFFFFF.

Figure 15:
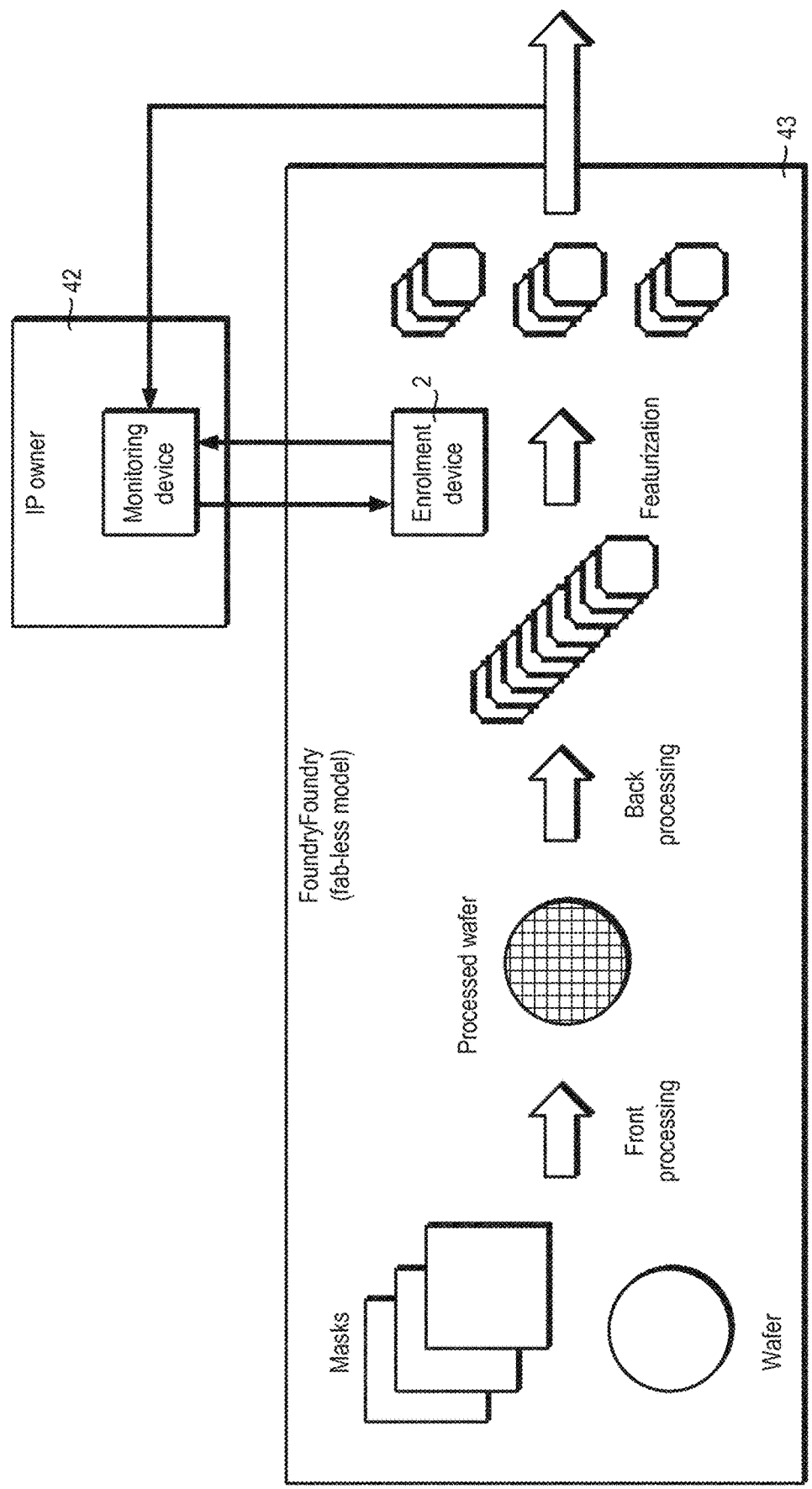
FIG. 15 illustrates device enrolment in a fab-less manufacturing environment.

Referring to FIGS. 14 and 15, device enrolment provides a way for fab-less or fab-light IP owner 42 to monitor production taking place at semiconductor foundries 43 since information identifying each manufactured integrated circuit and its respective enabled feature set is gathered. This can help to reduce or prevent overproduction.

It will be appreciated that many modifications may be made to the embodiments hereinbefore described.

For example, the configuration enabler 7 may be protected by a hash function.

The device enrolment allow fab-less or fab-light semiconductor vendor to protect against overproduction. However, device enrolment can also protect original equipment manufacturers and/or original device manufacturers (or "customers") to protect their products from being tampered or counterfeited. In one possible scheme, fixed-logic integrated circuits are delivered to customers before having been featurized. As such, the integrated circuits are only partially activated to allow the featurization process to take place, but are unable to run customer software. Customers first conduct the enrolment process using either an enrolment device located at their production facilities or accessing an enrolment device remotely via the Internet.

The invention claimed is:

1. A fixed logic integrated circuit comprising:
a unique code generator configured to generate a code having a value which is intrinsically unique to the integrated circuit, wherein the code is not transmitted outside the integrated circuit;
an enrollment pattern generator configured to generate an enrollment pattern based on the unique code and encrypt the enrollment pattern into an encrypted form;
wherein the integrated circuit is configured to transmit the enrollment pattern in the encrypted form to an external enrollment device and to receive enabling data from the external enrollment device, wherein the integrated circuit further comprises:
a configuration file generator configured to generate configuration data using the enabling data and the unique code, subsequently perform an error check to determine whether to validate or invalidate the configuration data and generate an error signal when a determination to invalidate the configuration data is made; and a feature activation module configured to, in dependence upon the error check and the configuration data, perform each of the following:
  activate features of the integrated circuit when the configuration data is validated by the error check;
  disable features of the integrated circuit when the configuration data is invalidated as a result of the error check; and
  customize one or more features of the integrated circuit in dependence on the configuration data;

a reset function configured to generate a reset signal in response to the error signal, and wherein the unique code generator, the enrollment pattern generator, the configuration file generator and the feature activation module are reset in response to the reset signal;

wherein the unique code generator comprises a physical unclonable function and the enrollment pattern generator is configured to remove noise from the code.

2. An integrated circuit according to claim 1, wherein configuration data comprises an activation pattern.

3. An integrated circuit according to claim 1, wherein the feature activation module is configured to activate a minimum set of features in response to incorrect configuration data.

4. An integrated circuit according to claim 1, wherein the unique code generator, the enrollment pattern generator, the configuration file generator and feature activation module are included in a minimum set of features.

5. An integrated circuit according to claim 1, wherein the unique code generator, the enrollment pattern generator, the configuration file generator and feature activation module comprise respective fixed-logic modules.

6. An integrated circuit according to claim 1, wherein the feature activation module is configured to activate at least one peripheral module in dependence upon the configuration data.

7. An integrated circuit according to claim 1, wherein the feature activation module is configured to customize one or more features of the integrated circuit by setting a clock speed in dependence upon the configuration data.

8. An integrated circuit according to claim 1, wherein the feature activation module is configured to set an amount of available memory in dependence upon the configuration data.

9. An integrated circuit according to claim 1, further comprising non-volatile memory for storing the enabling data.

10. An integrated circuit according to claim 1, which is a digital integrated circuit.

11. An integrated circuit according to claim 1, which is a mixed-signal integrated circuit.

12. An integrated circuit according to claim 1, which includes memory.

13. An integrated circuit according to claim 1, wherein the feature activation module is configured to perform each of the following:
  activate one or more features of the integrated circuit when the configuration data is validated by the error check;
  disable one or more features of the integrated circuit when the configuration data is invalidated by the error check; and
  customize one or more features of the integrated circuit by setting a clock speed in dependence on the configuration data.

* * * * *